United States Patent [19]

Kaku et al.

[11] Patent Number: 4,807,210
[45] Date of Patent: Feb. 21, 1989

[54] OPTICAL INFORMATION PROCESSING APPARATUS

[75] Inventors: Toshimitsu Kaku, Sagamihara; Kazuo Shigematsu, Kitakatsushika; Yoshito Tsunoda, Mitaka; Takeshi Maeda, Kokubunji, all of Japan

[73] Assignee: Hitachi, Ltd., Tokyo, Japan

[21] Appl. No.: 71,183

[22] Filed: Jul. 8, 1987

[30] Foreign Application Priority Data

Jul. 9, 1986 [JP] Japan .................. 61-159610

[51] Int. Cl.[4] ............................................. G11B 7/00
[52] U.S. Cl. ..................................... 369/44; 369/109; 369/275
[58] Field of Search ..................... 369/44, 45, 46, 109, 369/275

[56] References Cited

U.S. PATENT DOCUMENTS

| | | | |
|---|---|---|---|
| 4,583,212 | 4/1986 | Koide et al. | 369/219 |
| 4,663,751 | 5/1987 | Kaku et al. | 369/46 |
| 4,727,531 | 2/1988 | Ito et al. | 369/58 |
| 4,748,609 | 5/1988 | Yonezawa et al. | 369/44 |

Primary Examiner—William L. Sikes
Assistant Examiner—Frank González
Attorney, Agent, or Firm—Antonelli, Terry & Wands

[57] ABSTRACT

An optical information processing apparatus uses an optical disk having correction marks such as mirror surfaces or wobbled pits intermittently arranged along a guide track. In a reproduce mode, tracking control is effected by correcting a tracking signal by a tracking offset component detected by the correction marks. In a record or erase mode, the track offset correction is deactivated and record or erase operation is controlled in accordance with an output level of the detected track offset component so that incomplete eraser of recorded data is prevented.

6 Claims, 3 Drawing Sheets

OPTICAL INFORMATION PROCESSING APPARATUS

BACKGROUND OF THE INVENTION

The present invention relates to an optical information processing apparatus for recording and reproducing information to and from a record medium by a light beam, and more particularly to an optical information processing apparatus which is suitable to an erasable (rewritable) optical disk capable of recording, reproducing and erasing information.

As a tracking method in an optical information processing apparatus such as optical disk apparatus or optical card apparatus, a push-pull method has been known in which a diffraction light reflected by a guide track (pre-groove) is utilized for tracking. In the push-pull method, it has been known that a track offset is created by the inclination of the disk or the movement of a beam so that the stability of the tracking is disturbed. In order to prevent it, mirror surface portions are provided in the guide track (JP-A-No. 59-19250, U.S. Pat. No. 4,663,751) or wobbled pits are formed (U.S. Ser. No. 845,340). In those methods, a track offset component is detected from a correction mark such as mirror surface or wobbled pits and it is added to or subtracted from a tracking servo system by the guide groove to stabilize the track control.

However, the above techniques do not refer to a problem caused in recording or erasing information by feeding the offset component detected by the correction mark back to the tracking servo system by the guide track.

SUMMARY OF THE INVENTION

It is an object of the present invention to provide a highly reliable optical information processing apparatus which solves a problem of incomplete erasure caused in recording or erasing information by feeding an offset component detected by a correction mark back to a tracking servo system by a guide track.

In the present optical information processing apparatus, tracking correction by the correction mark is carried out only in reproducing mode, and the correction mark is used to detect the track offset component in record and erase modes and the record or erase operation is controlled in accordance with the output level of the offset component.

When a mirror surface is used as the correction mark, the track offset component is detected by sampling the output level at the mirror surface which appears in a tracking signal. When wobbled pits are used, the track offset component is detected by sampling two output levels for a pair of wobbled pits appearing in a reproduced data signal (signal representing light intensity of a reflected light) and differentiating the output levels. By correcting the tracking signal of the guide track by the track offset component detected by the correction mark, the track offset is reduced. However, if the correction mark is misdetected by dust or defect of a record film, the detected offset component is not normal. Thus, if the correction is made by such abnormal offset component, off-tracking will take place. In the record mode, error writing or recorded data destroying (data is recorded on a track having data recorded thereon) takes place in a worst case, and in the erase mode, the recorded data may be miserased or incompletely erased.

In order to prevent such a problem, in the present invention, the track offset correction is deactivated in the record and erase modes, and the correction mark is used for the detection of the track offset component. A range of track offset with respect to a track center within which incomplete erasure does not have a bad influence upon the record or erase mode is defined, and the track offset component detected by the correction mark is compared with the allowable track offset range, and if the track offset component exceeds the allowable track offset range, the record or erase operation is stopped. As a result, the incomplete erasure is prevented and the reliability of recorded data is enhanced.

DESCRIPTION OF THE PREFERRED EMBODIMENTS

Figure 1:
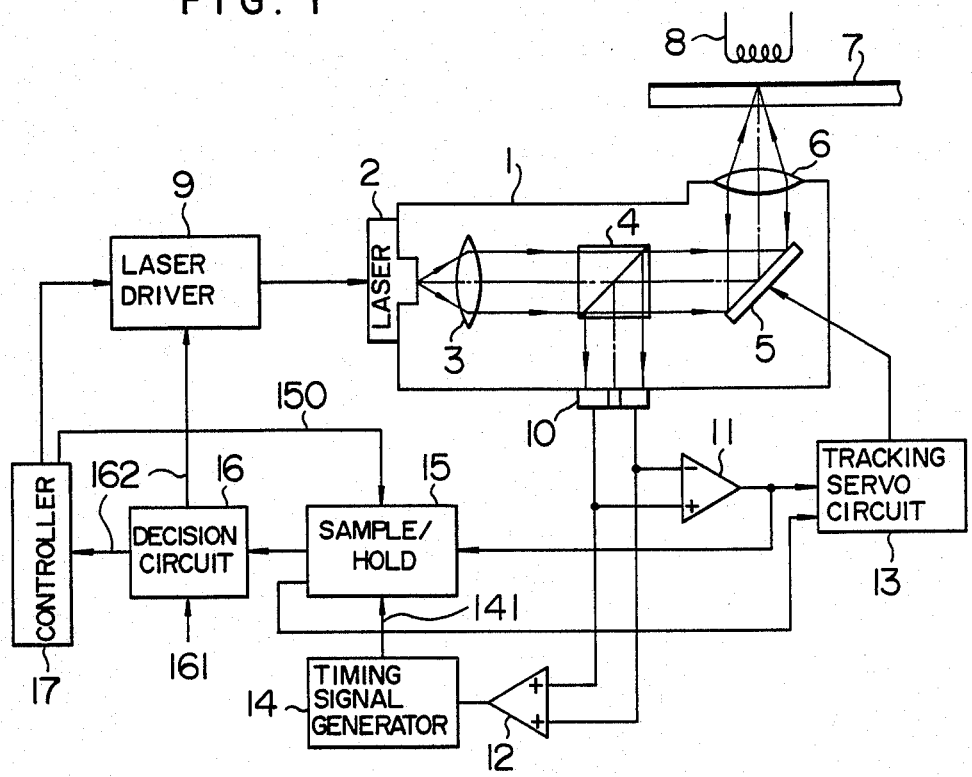
FIG. 1 shows a block diagram of one embodiment of an optical information processing apparatus of the present invention.

FIG. 1 shows one embodiment of the optical information processing apparatus of the present invention. An optical head 1 comprises a light source, an optical system for focusing a light from the light source to a record medium, and detection system for separating a light reflected by the record medium from an irradiated light and detecting it as an electrical signal. A divergent light emitted from the semiconductor laser 2 (light source) is collimated by a coupling lens 3, and it passes through a prism 4 and is deflected by a mirror 5 and is focused by a focusing lens 6 into approximately 1 μm on a reversible (erasable) optical disk bearing the record medium. The reversible (erasable) optical disk includes an opto-magnetic disk which records, reproduces and erases data by an opto-magnetic effect by using a vertically magnetized recording film, and a phase change type optical disk which utilizes a phase transition between crystalline state and amorphous state of the record medium. Since the effect of the present invention is same in both types of optical disks, the opto-magnetic disk is used in the present embodiment. The disk is rotated by a motor (not shown), and the optical head 1 is movable radially of the disk. In the record mode, a direction of magnetic field applied by an external magnetic field solenoid coil 8 is set oppositely to a direction of initial magnetization of the record film, and the semiconductor laser 2 is driven by the laser drive circuit 9 to generate a high output pulse in accordance with data to be recorded. Thus, the magnetization of the record film is eliminated by a heat of the high output pulse light and that area is oriented to the direction of the external magnetic field, and a domain is formed to record the data. In the erase mode, the direction of external magnetic field is set oppositely to that in the record mode and the semiconductor laser 2 is driven by the laser drive circuit 9 to generate a DC high output laser. As a result, the domain is extinguished and the data is erased.

In an overwritable reversible (erasable) disk, the recorded data can be erased by recording new data on the recorded data. Accordingly, recording and erasing are attained simultaneously. In the reproduce mode, a Kerr effect is ulitized to optically detect the direction of magnetization. The Kerr effect is defined as a phenomenon in which when a linearly polarized light is applied to a magnetized film, a polarization plane of the reflected light rotates to the right or left depending on the direction of magnetization (Kerr rotation). The Kerr rotation is converted to a light intensity by an analyzer (not shown), and the light is converted to an electrical signal for the reproduction of data.

Since the disk is usually made of a plastic substrate, the track offset may increase by the inclination of the disk and a servo characteristic is deteriorated. In order to compensate it, the track offset is corrected by using the correction marks such as mirror surfaces or wobbled pits arranged intermittently along the guide track (guide groove). Such correction is carried out only in the reproduce mode. In the record and erase modes, the track offset correction is not carried out in order to prevent misrecording or miserasing due to misdetection of the correction mark. In the record/erase mode, if a large track offset takes place and the light spot passes through a position which is significantly deviated from a center of track, the data is incompletely erased and the reliability of data is lowered. Thus, in the record/erase mode, the track offset component is detected by using the correction mark such as mirror surfaces or wobbled pits, and if the track offset is large, the record or erase operation is stopped.

A light reflected by the guide track of the disk 7 passes through the focusing lens 6 and the mirror 5, and is deflected by a prism 4 and directed to a two-divided photo-detector 10. Outputs of the two-divided photo-detector 10 are supplied to a differential amplifier 11 and a summing amplifier 12. An output of the differential amplifier 11 is used as a tracking signal which is applied to a tracking servo circuit 13 which drives the mirror 5 for moving the beam for tracking. An output of the summing amplifier 12 is used for detecting a header signal. The header signal is recorded in each of equally divided sectors around the track in the form of pit. The correction mark such as mirror surface or wobbled pits or both of them is also recorded in each sector.

Figure 2:
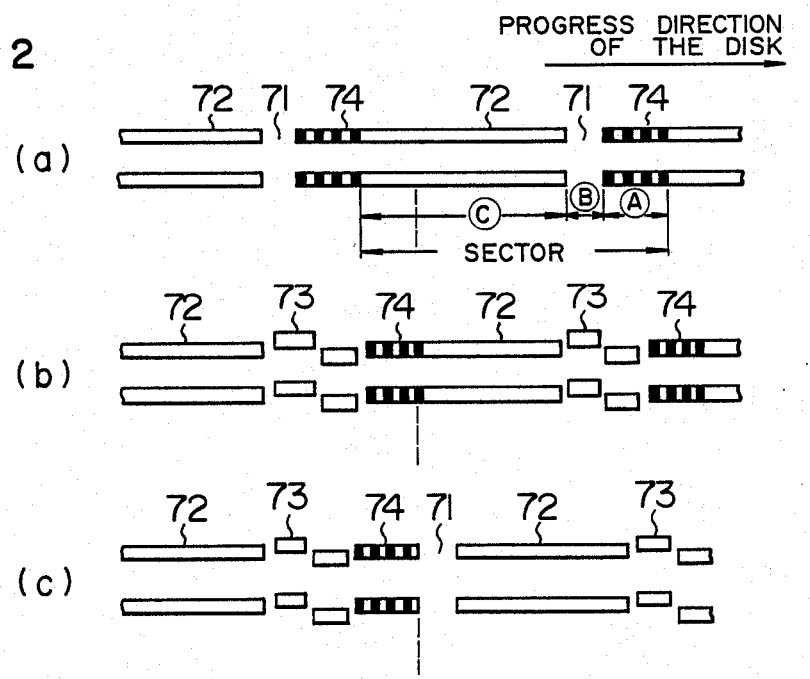
FIGS. 2(a), 2(b) and 2(c) show plan views of track patterns formed on a record plane of a record medium used in the present invention.

FIG. 2 shows track patterns formed on the record plane of the disk 7. In FIG. 2(a), the mirror surfaces are used as the correction marks, in FIG. 2(b), the wobbled pits are used, and in FIG. 2(c), both the mirror surfaces and the wobbled pits are used. In FIG. 2, the information is recorded on the guide track 72 (on-the-track recording), although the effect of the present invention is equally applicable when the information is recorded on a land between guide tracks (intertrack recording). The mirror surfaces 71 can be readily formed by intermittently interrupting the guide track (pre-groove) 72. Since there is no guide track in the interrupted area 71, only the track offset component due to the disk inclination and the beam movement is included in the reflected light from the interrupted area, and the track offset component can be detected by sampling the signal to the mirror surface which appears in the tracking signal. The wobbled pits 73 may be formed by forming two pits spaced by the same distance in positive and negative directions at different times with respect to a center of track (center of guide track 72 for on-the-track recording and center between the guide tracks 72 for the intertrack recording). The wobbled pits 73 are detected in the same reproduced signal system as that for the header signal 74, and if the light spot deviates from the center of track, there is a difference in the reproduced signal levels of the pair of wobbled pits 73. Thus, by sampling the levels and differentiating them, a signal representing the track offset can be detected. In the present invention, the same effect is attained whichever mark of the two correction marks is used. Accordingly, the mirror surface 71 is described in the following explanation.

Figure 3:
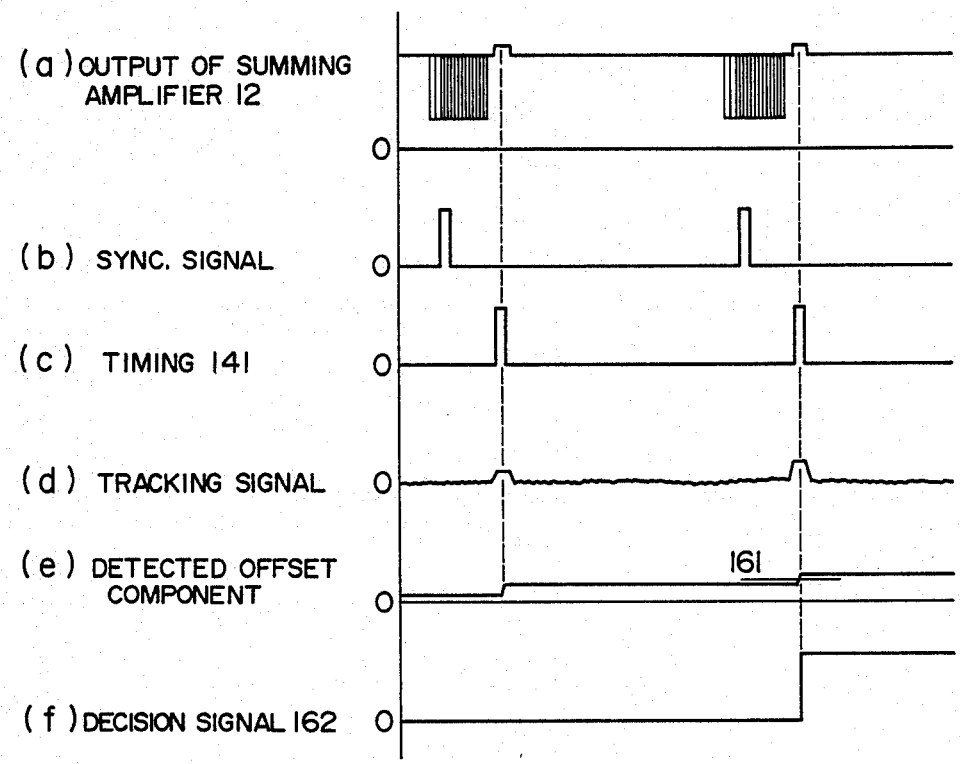
FIG. 3 shows waveforms for explaining the operation of the apparatus of FIG. 1.

When the disk 7 having the track pattern which uses the mirror surfaces as the correction marks as shown in FIG. 2(a) is used, the output of the summing amplifier 12 shown in FIG. 1 produces a waveform as shown in FIG. 2(a), in which A is a header signal area, B is the mirror surface port and C is a data record area having a guide track (pre-groove). The correction marks such as mirror surfaces 71 are usually arranged before and after the header signal 74 which includes a sector mark and track address information, and a timing for detecting the correction mark is generated at a timing generated on the basis of the header signal. FIG. 3(b) shows a synchronization signal for reading the track address, generated by the timing signal generator 14 in response to the header signal. With reference to the synchronization signal, a correction mark detection timing 141 shown in FIG. 3(c) is generated by using a clock-driven counter. The timing 141 is applied to the sample/hold circuit 15 which receives the tracking signal (FIG. 3(d)). By sampling the track offset component from the tracking signal generated when a light spot passes through the mirror surface, the track offset component shown in FIG. 3(e) is produced.

Figure 4:
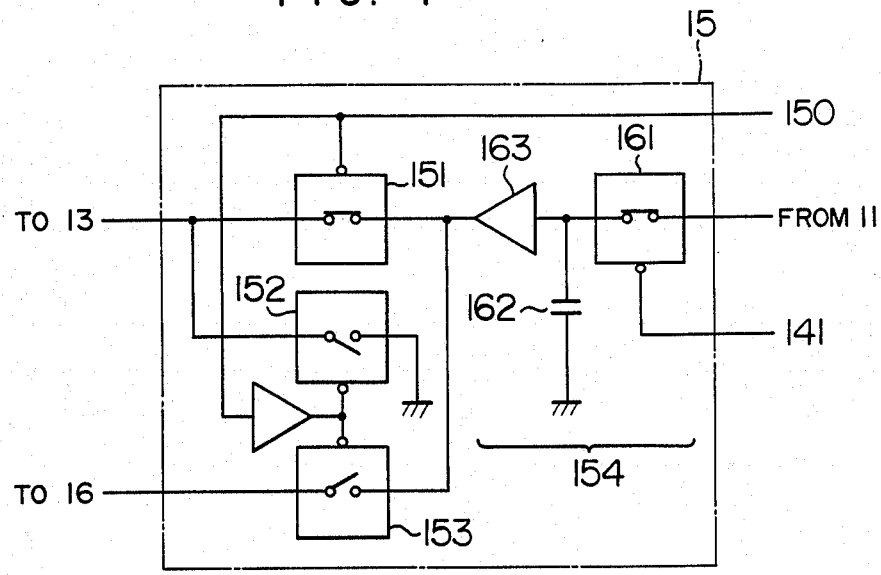
FIG. 4 shows a block diagram of an embodiment of a sample/hold circuit 15 used in the present invention.

FIG. 4 shows an embodiment of the sample/hold circuit 15. A sample/hold section 154 comprises an analog switch 161, a charge/discharge capacitor 162 and a buffer amplifier 163, and detects the track offset component. The sample/hold circuit 15 has a switching function to supply the detected track offset component to the tracking servo circuit 13 in the reproduce mode and supplies it to the decision circuit 16 in the record/erase mode. In the reproduce mode, an analog switch 151 is ON by a record/reproduce control signal 150 from the controller 17 and analog switches 152 and 153 are OFF. The output of the analog switch 151 is supplied to the tracking servo circuit 13 to effect the track offset correction operation. In the record/erase mode, the analog switch 151 is OFF by the control signal 150 and the analog switches 152 and 153 are ON. Thus, the track offset component is not supplied to the tracking servo circuit 13, and the track offset component is supplied to the decision circuit 16 as the output of the analog switch 153.

The decision circuit 16 is a comparator which compares the track offset component detected by the sample/hold circuit 15 with the level 161 corresponding to the allowable track offset range within which incomplete erasure of data does not take place in the record and erase modes, and produces an H (high) level signal 162 when the track offset component exceeds the level 161, and produces an L (low) level signal 162 when it does not exceed the level 161 (FIG. 3(b)). The allowable track offset range should be experimentarily determined. For example, when the numerical aperture (NA) of the focusing lens is 0.5, the range is ±0.05–±0.1 μm. When the signal 162 is H level, the record or erase operation is stopped, and the sector for which the record operation was interrupted is rerecorded to an alternative sector provided for error recovery, and the sector for which the erase operation was interrupted is reerased. When the normal erase operation is completed, the erase operation is continued, and if the offset component exceeds the level 161, the host controller 17 recognizes that sector is not usable, and it is not subsequently used.

Figure 5:
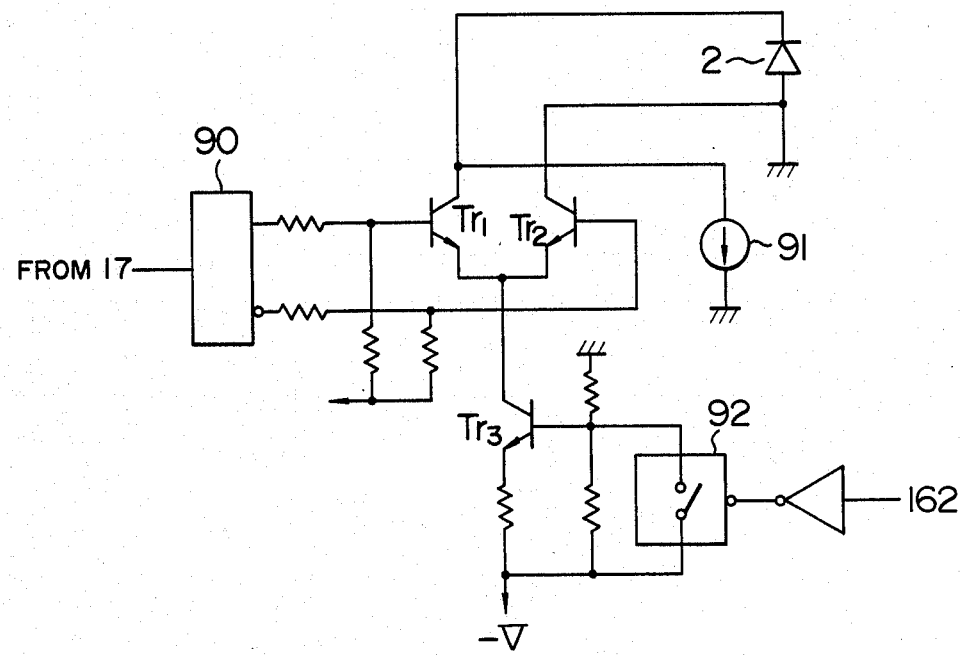
FIG. 5 shows a circuit diagram of an embodiment of a laser drive circuit 9.

FIG. 5 shows an embodiment of the laser drive circuit 9. It is basically a current switch circuit comprising transistors Tr 1 and Tr 2, and pulse-modulates a current to drive the laser 2 through a TTL/ECL conversion IC 90 in accordance with a record data pulse or erase pulse sent from the controller 17. An amplitude of the record/erase pulse current is determined by a transistor Tr 3 which is a current source of the current switch. A DC current source 91 for a reproducing power is also supplied to the current switch circuit. Accordingly, in the present circuit, the laser drive current is the DC current having the record/erase pulse current superimposed thereon. The signal 162 from the decision circuit 16 is supplied as a control signal to an analog switch 92 arranged between a base of the transistor Tr 3 which determines the amplitude of the record/erase pulse current and a power supply $-V$ to turn on the analog switch 92 to turn off the record/erase pulse current when the track offset is large, and turn off the analog switch 92 to effect the record/erase operation when the track offset is normal.

In accordance with the present invention, the correction marks such as mirror surfaces or wobbled pits which are used in the reproduce mode to correct the track offset are used in the record/erase mode to detect the track offset, and the detected track offset is compared with the allowable track offset range for the record/erase mode, and if it exceeds the allowable range, the record/erase operation is stopped so that the incomplete erasure is prevented and the reliability of data is improved.

We claim:

1. An optical information processing apparatus comprising:
    a record medium having a guide track and intermittently arranged correction marks;
    an optical system for focusing light to said record medium;
    modulation means for changing an intensity of the light between a reproduce mode and a record mode;
    a detector for detecting a light reflected by said record medium to produce an electrical signal;
    track error detection means for detecting a tracking signal from said electrical signal;
    offset detection means for detecting a track offset from said electrical signal when said light irradiates said correction marks;
    tracking control means connected to said track error detection means and said offset detection means for correcting the tracking signal by the track offset to effect tracking control; and
    control means for deactivating the correction in a record mode and comparing an output level of said offset detection means with a predetermined level and controlling said modulation means in accordance with the comparison result.

2. An optical information processing apparatus according to claim 1 wherein said correction marks are mirror surfaces.

3. An optical information processing apparatus according to claim 1 wherein said correction marks are wobbled pits.

4. An optical information processing apparatus according to claim 1 wherein said correction marks comprise mirror surfaces and wobbled pits.

5. An optical information processing apparatus according to claim 1 wherein said control means includes a decision circuit for comparing the output of said offset detection means with the predetermined level and a switching circuit for supplying the output of said offset detection means to said tracking control means and said decision circuit in the reproduce mode and the record mode respectively.

6. An optical information processing apparatus comprising:
    an optical disk having correction marks arranged in a guide track thereof;
    a light source;
    an optical system for directing a light emitted from said light source to said optical disk;
    a track offset detection circuit for detecting a track offset from said correction marks; and
    a decision circuit for checking an output level of said track offset detection circuit;
    record or erase operation of data to said optical disk being controlled in accordance with the output of said decision circuit.

* * * * *